Feb. 25, 1936.  E. E. HEWITT  2,032,172
FLUID PRESSURE BRAKE
Filed July 23, 1932
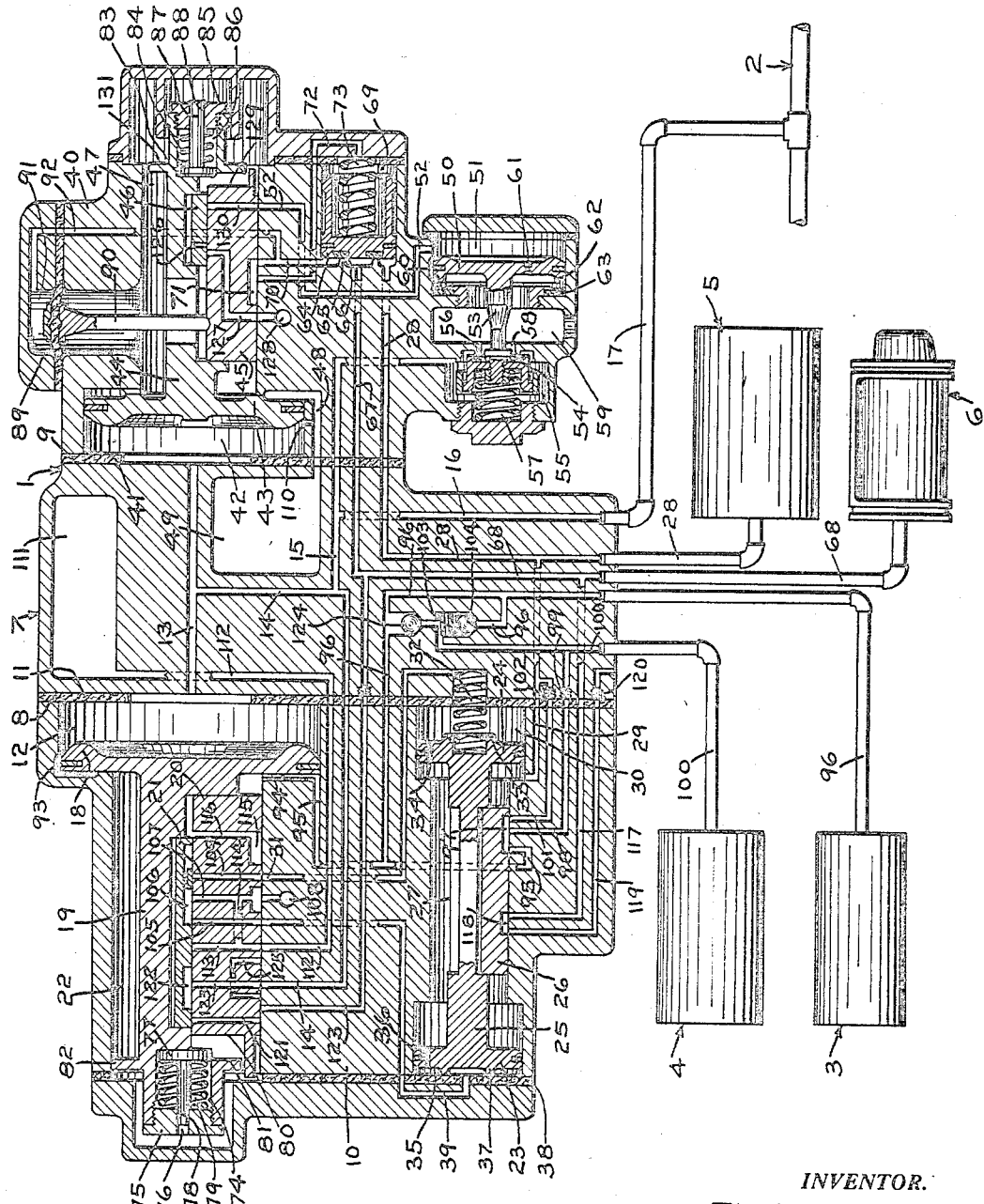
INVENTOR.
ELLIS E. HEWITT
By
ATTORNEY.

Patented Feb. 25, 1936

2,032,172

UNITED STATES PATENT OFFICE 2,032,172

FLUID PRESSURE BRAKE

Ellis E. Hewitt, Edgewood, Pa., assignor to The Westinghouse Air Brake Company, Wilmerding, Pa., a corporation of Pennsylvania Application July 23, 1932, Serial No. 624,283

24 Claims. (Cl. 303—74)

This invention relates to fluid pressure brakes, and more particularly to fluid pressure brake equipment for controlling the application and release of the brakes on cars of a railway train.

The present standard fluid pressure brake equipment for railway cars was designed for handling trains of a length up to one hundred cars. In recent years, however, trains of more than one hundred cars have frequently been operated on various railroads.

As a consequence of the increased length of trains, it has become increasingly difficult to so control the service application of the brakes, as to ensure that the brakes will be applied on all the cars throughout the train; to secure the sure and prompt release of the brakes; to ensure that quick serial action will be propagated throughout the train both in service and emergency applications of the brakes with the desired rapidity; to ensure against the initiation of an emergency application of the brakes when not desired or intended; and to ensure the prompt release of the brakes after an application.

The principal object of my invention is to provide an improved fluid pressure brake equipment capable of controlling the application and release of the brakes, particularly on longer trains than can now be operated, with promptness, certainty and dependability over a long period of service, and such that the above difficulties are avoided; and to improve materially the operation of the brakes on trains of the present ordinary length.

Another object of my invention is to provide an improved valve mechanism for controlling a service application of the brakes and for controlling the recharge of the equipment and the release of the brakes after a service application.

For accomplishing the above object, I propose to employ a triple valve device for controlling the local quick service venting of fluid from the brake pipe and for controlling the flow of fluid to the brake cylinder, and to further employ a relay valve device, which is controlled by the triple valve device, to establish or disestablish an atmospheric communication through which fluid is adapted to be released from the brake cylinder and to establish or disestablish a charging communication between the brake pipe, fluid pressure storage means, such as an auxiliary reservoir and a service reservoir, and an emergency reservoir.

By thus having the relay valve device control the brake cylinder exhaust communication and the charging communication before mentioned, the triple valve slide valves will be less complicated, have less seating area, and will be more sensitive to movement than would be the case if the triple valve slide valves were employed to provide this control.

Another object of my invention is to provide a fluid pressure brake equipment having improved means for back dumping fluid under pressure from a charged reservoir, such as an emergency reservoir, to an auxiliary reservoir to assist in recharging the equipment in releasing the brakes after a service application.

A further object of my invention is to provide a fluid pressure brake equipment having improved means for providing a high braking power in an emergency application of the brakes.

Other objects and advantages will appear in the following more detailed description of the invention.

In the accompanying drawing, the single figure is a diagrammatic view, mainly in section, of a fluid pressure brake equipment embodying the invention.

As shown in the drawing, the fluid pressure brake equipment may comprise a brake controlling valve mechanism 1, a brake pipe 2, auxiliary reservoirs 3 and 4, the reservoir 4 being hereinafter termed a service reservoir, an emergency reservoir 5, and a brake cylinder 6.

The brake controlling valve device 1 comprises a service application portion, an emergency portion and a pipe bracket 7 having at one side a clamping face 8 and at the opposite side a clamping face 9.

The service application portion of the valve device 1 comprises a casing 10 which is clamped to the pipe bracket 7 in any desired manner, there being a gasket 11 interposed between the clamping face 8 of the pipe bracket and the adjacent clamping face of the casing 10. The casing 10 has a piston chamber 12, connected through passages 13, 14, 15 and 16 in the pipe bracket and pipe 17, with the brake pipe 2, and containing a triple valve piston 18 having a stem 19 adapted to actuate a main slide valve 20 and an auxiliary slide valve 21 contained in a valve chamber 22, the graduating valve being mounted on and having a movement relative to the main slide valve.

Also mounted in the casing 10 is a relay valve mechanism comprising spaced pistons 23 and 24 operatively connected together by a stem 25, which operatively engages both ends of a slide valve 26 contained in a chamber 27 defined by the casing and inner faces of the pistons, and to which the emergency reservoir 5 is constantly connected through a pipe and passages 28 and a branch passage 29.

At the outer side of the relay piston 24 there is a chamber 30 which leads, through a passage 31, to the seat of the main slide valve 20 and which contains a spring 32 interposed between and engaging the piston and casing. The piston 24 is provided with an annular rib 33, which is adapted to seat on the gasket 11 and close off communication between the piston chamber 30 and passage 31, and is also provided with a small port 34 through which the valve chamber 27 is constantly connected to the piston chamber 30.

At the outer side of the relay piston 23 there is a chamber 35 to which the valve chamber 27 is constantly connected through a small port 36 provided in the piston. The piston 23 is also provided with an annular seat rib 37, which is adapted to seat against a gasket 38 as shown in the drawing and close communication between the piston chamber 35 and a passage 39 leading to the seat of the main slide valve 20. It will here be noted that the spring 32 acts to maintain the pistons 23 and 24 and slide valve 26 in their brake releasing positions in which they are shown in the drawing.

The emergency portion of the valve device 1 comprises a casing 40 which is clamped to the pipe bracket 7 in any desired manner, there being a gasket 41 interposed between the clamping face 9 of the pipe bracket and the adjacent clamping face of the casing 40. The casing 40 has a piston chamber 42 which is open to the passage 13, and therefore to the brake pipe 2, and contains an emergency piston 43 having a stem 44 adapted to actuate a main slide valve 45 and an auxiliary slide valve 46 contained in a valve chamber 47, which is connected through a passage 48 with a quick action chamber 49 provided in the pipe bracket 7.

The emergency portion also comprises a quick action vent valve device having a quick action piston 50 contained in a chamber 51 open to a passage 52 leading to the seat of the emergency main slide valve 45, said piston having a stem 53 adapted to control the operation of a quick action vent valve 54 contained in a chamber 55 to which the brake pipe 2 is constantly connected through the passage 15. This valve is normally maintained seated against an annular seat rib 56 by the action of a spring 57, thus closing communication from the valve chamber 55 to a passage 58 leading to a chamber 59 which is constantly open to the atmosphere.

With the quick action piston 50 in its normal position, the piston chamber 51 is open to the chamber 59 and consequently to the atmosphere through a leakage groove 60 around the piston and also through a small port 61 in the piston. This leakage groove has a fairly large flow area, so that fluid under pressure which may unintentionally leak into the piston chamber 51, by way of passage 52, at a faster rate than it could escape through the port 61, is not permitted to create a sufficient pressure differential to cause the quick action piston to operate to unseat the quick action valve 54.

The quick action piston 50 is provided with an annular rib 62, which is adapted to seat on a gasket 63 to prevent unintentional leakage of fluid from tthe quick action piston chamber 51 to the atmosphere.

The emergency portion further comprises a high pressure valve device which may comprise a valve piston 64 carrying on one side a valve 65, which is normally maintained seated on a seat rib 66.

The inner seated area of the valve piston is open to a passage 67, which is connected through a passage and pipe 68 with the brake cylinder 6. The outer seated area is open to the passage 28 leading from the emergency reservoir 5. At the other side of the valve piston there is a chamber 69 to which, with the emergency main slide valve 45 in its normal position, as shown in the drawing, is connected the emergency reservoir 5 by way of the outer seated area of the valve piston, a passage 70, a cavity 71 in the slide valve 45, and a passage 72.

The valve piston 64 is subjected on one side to the pressure of a coil spring 73 contained in the chamber 69.

The rear end portion of the piston stem 19 of the triple valve piston 18 is provided with a bore 74, which is closed at one end by a plug 75 having screw-threaded connection with the stem, said plug being provided with a central bore 76. Below the lower surface of the major portion of the piston stem, the other end of the bore 74 is open. The inner end wall of the bore 74 forms a stop shoulder, which is adapted to be engaged by a plunger 77 slidably engaging the stem within the bore. The plunger is provided with a stem 78, which is slidably guided by the plug 75 within the bore 76. Interposed between and engaging one side of the plunger 77 and the plug 75, is a spring 79 which acts to normally maintain the plunger in engagement with the end wall of the bore 74. In this position, the face of the plunger 74 will be closer to the rear vertical surface 80 of the main slide valve 20 than will be the face 81 of the usual annular operating collar 82 with which the piston stem 19 is provided, so that, in effecting a service application of the brakes, the plunger will engage the main slide valve and yieldably resist movement of the piston 18 and auxiliary slide valve 21 before the collar 82 engages the main slide valve. The purpose of this is to stabilize the action of the triple valve parts as will hereinafter more fully appear. This stabilizing mechanism also acts to assist in breaking the seal between the piston 18 and the gasket 11 in effecting the release of the brakes, and further serves as a graduating spring for shifting the piston 18, and thereby the auxiliary slide valve 21, to service lap position, all of which will hereinafter be more fully described.

The rear end portion of the emergency piston stem 44 carries a mechanism which, in construction, is quite similar to the stabilizing mechanism carried by the rear end of the triple valve piston stem 19, and comprises a plunger 83, which is subject to the pressure of a spring 84 interposed between and engaging the plunger and a plug 85 having screw-threaded connection with the piston stem. The plunger is slidably guided within a bore 86 provided in the stem and has a stem 87, which is slidably guided in a central bore 88 provided in the plug 85. This mechanism is adapted to cooperate with the emergency main slide valve 45 to assist in shifting the emergency piston 43 out of sealing engagement with the gasket 41 in releasing the brakes after an emergency application and is also adapted to assist in preventing the emergency valve device from being unintentionally moved to emergency position when a service application of the brakes is being effected, all of which will be more fully described in the following description.

For the purpose of preventing fluid under pressure on the under side of the emergency main slide valve 45 from raising the valve from its seat when the pressure of fluid in the emergency valve chamber 47 is reduced, a loading mechanism is provided. This mechanism may comprise a flexible diaphragm 89, which is mounted in the casing 49 and which operatively engages a rocking pin 90, through which a loading force is adapted to be transmitted from the diaphragm to the main slide valve 45. The emergency valve chamber 47 is open to one side of the diaphragm and at the opposite side of the diaphragm there is a chamber 91 to which the emergency reservoir 5 is connected by way of passage 70 and a branch passage 92.

In operation, when the brake pipe 2 is being charged with fluid under pressure in the usual well known manner, fluid flows from the brake pipe 2 through the pipe 17 and connected passages 16, 15, 14 and 13 to both the service application piston chamber 12 and emergency piston chamber 42.

With the triple valve piston 18 and other parts of the service application portion of the brake controlling valve device 1 in release position, as shown in the drawing, fluid supplied to the piston chamber 12 flows through the usual feed groove 93 and a groove 94 to the valve chamber 22. Fluid under pressure supplied through the feed groove also flows through a passage 95 and a passage and pipe 96 to the reservoir 3.

From the passage 95 fluid flows to a cavity 97 in the relay slide valve 26 and from thence flows, through a passage 98, a choke plug 99 and passage and pipe 100 to the service reservoir 4, and from the cavity also flows through a passage 101 and a choke plug 102 to passage 29 leading to the relay valve chamber 27 and to the passage 28 connected to the emergency reservoir 5.

The port or passage through the choke plug 99 in the passage 98 is restricted, so that the reservoir 4 is charged with fluid at a restricted rate as determined by the flow area of this port.

When the pressure of fluid in the auxiliary reservoir 3 has been built up to a predetermined degree higher than the pressure of fluid in the service reservoir 4, as determined by the pressure of a spring 103 on a ball valve 104, for example, a differential pressure of ten pounds, the valve 104 will unseat and permit a rapid flow of fluid from the passage 96 to the passage 100 and consequently to the reservoir 4.

Fluid under pressure supplied to the relay valve chamber 27 flows through the port 34 in the piston 24 to the chamber 30 and passage 31 and also flows through the port 36 in the piston 23 to the chamber 35 or outer seated area of the piston 23.

With the triple valve slide valves in release position, the inner seated area of the piston 23 is connected to the atmosphere by way of passage 39, a port 105 in the main slide valve 20, a cavity 106 in the auxiliary slide valve 21, a port 107 in the main slide valve 20 and a passage 108. The passage 31 leading from the relay piston chamber 30 is connected to the seat of the auxiliary slide valve 21 through a port 109 in the main slide valve 20, which latter port is lapped by the auxiliary slide valve.

From the passage 28 fluid flows to the chamber 69 of the high pressure valve device by way of the high pressure valve chamber, passage 70, cavity 71 in the emergency main slide valve 45 and passage 72. Fluid also flows from the passage 70 through passage 92 to the diaphragm chamber 91 of the emergency valve loading mechanism.

The port or passage through the choke plug 102 in the passage 101 is restricted, so that the emergency reservoir 5 and other volumes connected therewith are charged with fluid at a restricted rate as determined by the flow area of this port. By thus restricting the rate of flow of fluid, more fluid will flow toward the rear of the train than would be the case if the flow of fluid were at a fast rate, thus shortening the period of time required to charge the equipment to a safe working pressure. The choke plug 102 also governs the rate of flow of fluid from the emergency reservoir to the reservoirs 3 and 4 in recharging the equipment to release the brakes.

With the emergency valve device in release position, as shown in the drawing, fluid under pressure supplied to the piston chamber 42 flows through a port 110 and passage 48 to the quick action chamber 49 and to the emergency valve chamber 47. It will be noted that the pressures of fluid on opposite sides are substantially equal, so that the loading mechanism will not act to load the emergency slide valve 45.

From the passage 15 fluid flows to the quick action vent valve chamber 55.

With the triple valve main slide valve 20 in release position a quick service reservoir or chamber 111 is open to the atmosphere by way of a passage 112, a port 113 in the main slide valve 20, a restricted passage 114 in the main slide valve, port 107 in the main slide valve and passage 108. Further with the main slide valve 20 in this position, a loading and unloading cavity 115 in the valve is supplied with fluid under pressure from the valve chamber 22 by way of a port 116 which is uncovered by the auxiliary slide valve 21.

With the relay valve device in release position the brake cylinder 6 is open to the atmosphere by way of pipe and passage 68, a branch passage 117, a cavity 118 in the relay slide valve 26 and a passage 119, there being a choke plug 120 in passage 117 to restrict the rate of discharge of fluid from the brake cylinder in releasing the brakes.

Service application

A service application is initiated by effecting a gradual reduction in brake pipe pressure in the usual well known manner. Since, as before described, the brake pipe 2 is in communication with the triple valve piston chamber 12 and with the emergency piston chamber 42, the pressures of fluid in these chambers gradually reduce with the brake pipe pressure.

Upon a predetermined, but light, reduction in pressure in the triple valve piston chamber 12, the pressure of fluid in the valve chamber 22 causes the triple valve piston 18 to move outwardly in a direction toward the right hand, and through the medium of the piston stem 19, shifts the auxiliary slide valve 21 in the same direction relative to the main slide valve 20. As the auxiliary slide valve 21 is thus shifted, it laps the port 105 in the main slide valve 20, thus closing the communication from the inner seated area of the relay piston 23 to the atmosphere. The piston in its traverse closes the feed groove 93, so as to prevent back flow of fluid under pressure from the valve chamber 22 to the piston chamber 12. After the port 105 in the main slide valve has been lapped the cavity 106 in the auxiliary slide valve connects the ports 109 and 116 to the port 107, which is in registration with the passage 108 open to the atmosphere.

Since the passage 31, leading from the relay piston chamber 30, is in registration with the port 109 in the main slide valve, fluid under pressure is now vented from this chamber to the atmosphere, the flow of fluid from the chamber being at a faster rate than fluid is permitted to flow to the chamber 30 through the port 34 in the relay piston 24. With the piston chamber 30 thus vented, fluid under pressure in the relay piston chamber 35 causes the pistons to move to their extreme right hand positions compressing the spring 32 and causing the seat rib 33 to engage the gasket 11 to prevent the escape of fluid from the outer seated area of the relay piston 23, and consequently from the emergency reservoir 5, to the atmosphere. The relay pistons, through the medium of the stem 25, shift the relay slide valve 26 in the same direction to application position in which the slide valve laps the passages 117 and 119, thus closing communication from the brake cylinder to the atmosphere. In application position the relay slide valve disestablishes communication between the passages 95, 98 and 101, so that there will be no back flow of fluid under pressure from the emergency reservoir 5 to the valve chamber 22 of the triple valve device or to the reservoirs 3 and 4.

With the port 116 in the main slide valve 20 connected to the atmosphere the cavity 115 is at atmospheric pressure, so that fluid under pressure acting on the main valve over an area equal to the area of the upper surface of the cavity 115, imposes a seating pressure on the valve 20 and thus increases the resistance of the valve to movement toward application position.

After the feed groove 93 has been closed, the continued outward movement of the piston 18 causes the rear end of the auxiliary slide valve 21 to uncover a service port 121 in the main slide valve, following which the plunger 77, mounted in the rear end portion of the piston stem 19, engages the rear surface 80 of the main slide valve 20. The further outward movement of the auxiliary slide valve 21 by the piston 18 is now resisted by the spring 79 acting through the piston stem 19. Now, when a predetermined light reduction in brake pipe pressure has been effected, say for instance about one pound, a sufficient fluid pressure differential is created on the piston 18, so that the piston will be caused to move outwardly, overcoming the resistance offered by the spring 79, and shifting the auxiliary slide valve to initial quick service position.

In the initial quick service position of the auxiliary slide valve 21, a cavity 122 in the valve connects the port 113 in the main slide valve to a port 123 also in the main slide valve. The port 113 is in registration with the passage 112 leading to the quick service chamber 111 and the port 123 is in registration with the brake pipe 14, so that when the ports are connected by way of the cavity 122, fluid under pressure is permitted to flow from the brake pipe to the quick service chamber 111. From the port 113 fluid under pressure may flow to the atmosphere at a restricted rate through the restricted passage 114, port 107 and passage 108, but this flow will have no appreciable effect upon the local reduction in brake pipe pressure.

The initial local quick service flow of fluid from the brake pipe to the quick service chamber 111 is at a fast rate and produces a sudden reduction in brake pipe pressure, which acts to hasten the operation of the triple valve parts on the next car in a train to initial quick service position and also acts to hasten the operation of the local triple valve parts to application position. The triple valve parts on said next car then operate in a similar manner, and in this way, a quick serial response to the brake pipe reduction is transmitted from one car to the next throughout the length of the train and as a result the triple valve parts are quickly shifted to application position.

With the main slide valve 20 in application position, the service port 121, which has been previously uncovered by the auxiliary slide valve 21, registers with a passage 123 leading to the brake cylinder passage 68, so that fluid under pressure is now supplied from the valve chamber 22 and the auxiliary reservoir 3 and also from the service reservoir 4 to the brake cylinder 6. The flow of fluid from the reservoir 4 to the brake cylinder is by way of pipe and passage 100, past a ball check valve 124 and passage 96.

Further, with the main slide valve 20 in application position, a restricted passage 125 in the valve connects the passages 14 and 112, so that a further local venting of fluid under pressure from the brake pipe to the quick service chamber 111 takes place, which reduction is sufficient to insure the piston 18 and slide valves 20 and 21 remaining in application position to insure an effective brake cylinder pressure being developed. The rate at which this quick service reduction is effected is relatively slow, so as to prevent surges of fluid in the brake pipe which might be caused if a fast flow of fluid were permitted and further to dampen surges of fluid in the brake pipe which may be created upon effecting the initial local reduction in brake pipe pressure.

With the main slide valve 20 in application position, a tail cavity of the port 107 connects the passage 31 to the atmosphere, so that the inner seated area of the relay piston 24 is at atmospheric pressure, thus insuring that the relay valve parts will remain in application position.

It will be noted that the cavity 115 in the main slide valve is connected to the atmosphere before the initial quick service venting takes place and remains open to the atmosphere while the slide valves are in application position. This maintains the slide valve 20 so loaded as to effectively prevent the spring 79 from moving the valve forwardly beyond application position.

When the auxiliary reservoir and service reservoir pressures have been reduced by flow to the brake cylinder to a degree slightly less than the reduced brake pipe pressure, the piston 18 is operated in the usual manner to move the graduating valve 21, so as to lap the service port 121, and thus prevent the further flow of fluid under pressure to the brake cylinder. It will here be noted that the pressure of the spring 79 of the stabilizing mechanism assists in moving the piston out of engagement with the gasket 11.

With the auxiliary slide valve in lap position, the stabilizing mechanism will have been moved out of engagement with the main slide valve and the cavity 115 will be supplied with fluid under pressure from the valve chamber 22 unloading the main slide valve.

Upon the reduction in fluid pressure in the emergency piston chamber 42 at a service rate, the emergency piston 43 and auxiliary slide valve 46 are shifted outwardly, i. e., in the direction toward the left hand, relative to the main slide valve 45 by fluid in the valve chamber 47 at quick action chamber pressure. As the piston is thus shifted, it closes the communication between the emergency piston chamber 42 and the passage 48 leading to the quick action chamber 49 and emergency valve chamber 47, and at substantially the same time, a port 126 in the auxiliary slide valve 46 is brought into registration with a port 127 in the main slide valve 45, which latter port registers, at the seat of the main valve, with a passage 128 open to the atmosphere. Fluid under pressure now flows through the registering ports and passage from the emergency valve chamber 47 and connected quick action chamber 49 to the atmosphere at a rate substantially equal to the service rate of reduction in the pressure of fluid in the emergency piston chamber 42, so that the operating pressure differential on the piston 43 is substantially destroyed. In the service application position of the emergency piston, the plunger 83, carried by the emergency piston stem 44, is adapted to just engage the rear end surface 129 of the main slide valve 45, so that unintentional further movement of the piston and auxiliary slide valve toward the left hand is prevented by the action of the spring 84. When the pressure of fluid in the valve chamber 47 reduces by flow to the atmosphere, fluid at emergency reservoir pressure present in diaphragm chamber 91 exerts an inwardly directed force on the diaphragm 89, which is transmitted through the rocking pin 90 to the main slide valve 45 and which so loads the main valve as to eliminate the danger of the valve being raised from its seat by fluid under pressure in the cavity 71 of the valve. This loading also eliminates any tendency of the main valve to move under the action of the spring 84 in the event of the piston 43 moving a sufficient distance to effect a slight compression of the spring.

*Release of the brakes*

In order to release the brakes, the brake pipe pressure is increased in the usual manner, causing the movement of the piston 18 and thereby the slide valves 20 and 21 to release position.

With the slide valves in release position, the port 109, which registers with the passage 31 leading from the relay piston chamber 30, is lapped by the auxiliary slide valve and the port 105, which is in registration with the passage 39 leading from the relay piston chamber, is connected by way of the cavity 106 in the auxiliary slide valve, port 107, and passage 108 to the atmosphere. Fluid under pressure is now vented, through this latter communication, from the relay piston chamber at a faster rate than fluid flows through the small port 36 in the relay piston 23 to the chamber, so that the pressure of fluid in the relay piston chamber 30, together with the pressure of the spring 32, acts on the relay piston 24 to move both pistons and relay slide valve 26 to their extreme left hand or release position as shown in the drawing.

With the relay slide valve 26 in release position, fluid under pressure is released from the brake cylinder 6 to the atmosphere by way of pipe and passage 68, passage 117, cavity 118 in the valve, passage 119 and choke plug 120, thus the brakes are released.

In the release position of the piston 18, fluid under pressure is supplied to the valve chamber 22 and reservoirs 3 and 4 by way of the feed groove 93 in the same manner as before described, and with the relay slide valve 26 in release position, the cavity 97 in the relay valve again connects the passages 95, 98 and 101, so that fluid under pressure from the fully charged emergency reservoir 5 flows at a restricted rate through choke plug 102 to the reservoirs 3 and 4 and to the triple valve chamber 22. Due to the supply of fluid from the emergency reservoir, the amount of fluid initially flowing from the brake pipe to the reservoirs 3 and 4 will not be great, so that more fluid will flow through the brake pipe toward the rear of the train than would be the case if the emergency reservoir were cut off from the reservoirs 3 and 4, thus hastening the charging of the brake pipe on the cars at the rear end of the train.

After the equalization of the fluid pressures in the reservoirs 3, 4 and 5, these reservoirs are finally charged with fluid under pressure from the brake pipe by way of the feed groove 93.

Upon effecting an increase in brake pipe pressure to release the brakes, the emergency valve piston 43 and auxiliary slide valve 46 will be shifted to their release position, in which position they are shown in the drawing, so that the valve chamber 47 and quick action chamber 49 will be recharged in the same manner as before described.

With the triple valve device and relay valve device in release position, it is important to note, that while the valve chamber 22 and auxiliary reservoir 3 are recharged from the brake pipe 2 through the feed groove 93 and from the emergency reservoir 5 at substantially the same rate as in the conventional triple valve device, the service reservoir 4 can only recharge at a restricted rate, as permitted through the choke plug 99, until the pressure in valve chamber 22 and auxiliary reservoir 3 has been increased a predetermined amount over the pressure of fluid in the service reservoir 4, such as ten pounds, or sufficient to overcome the pressure of the spring 103, at which time the check valve 104 is permitted to unseat and allow flow from the auxiliary reservoir passage 96 to the service reservoir 4 at a relatively unrestricted rate, until the pressure in the service reservoir 4 has again been increased to within ten pounds of the auxiliary reservoir pressure, when the check valve 104 will be seated and further recharge of the service reservoir will take place through the choke plug 99.

In view of the initial recharging of the service reservoir 4 at a slower rate than the auxiliary reservoir 3, when a light subsequent application of the brakes is made, if effected before the fluid in the brake cylinder 6 has been completely released, fluid under pressure will only be supplied from the valve chamber 22 and auxiliary reservoir 3 to the brake cylinder, since the pressure in the service reservoir 4 is less than the pressure in auxiliary reservoir 3, and consequently fluid will not flow past the check valve 124 from the service reservoir 4 to the auxiliary reservoir 3.

As a consequence, on the subsequent brake application, the brake cylinder pressure will build up at the ratio as determined by the volume of the auxiliary reservoir 3 relative to the volume of the brake cylinder, such as, for example, a build-up of two pounds for each pound reduction in brake pipe pressure, as compared with the usual build-up of three and one-quarter pounds for each pound reduction in brake pipe pressure. When, however, the pressure in the auxiliary reservoir has been reduced, by flow to the brake cylinder, to substantially the pressure existing in the service reservoir, then further reduction by flow to the brake cylinder takes place from both the auxiliary reservoir and the service reservoir.

*Emergency application*

To effect an emergency application of the brakes, fluid under pressure is suddenly vented from the brake pipe 2, and consequently from the triple valve piston chamber 12 and emergency piston chamber 42, and upon said reduction the triple valve parts operate, in the same manner as in effecting a service application of the brakes, to supply fluid under pressure from the reservoirs 3 and 4 to the brake cylinder.

At substantially the same time as the triple valve device operates upon an emergency reduction in brake pipe pressure, fluid in the emergency valve chamber 47 causes the emergency piston 43 to move outwardly and first shift the auxiliary slide valve 46 relative to the main slide valve 45 and then shift both slide valves in unison to emergency position, in which position the piston engages the gasket 41. As the piston 43 is thus moved, it closes the communication through the port 110 from the emergency piston chamber 12 to the passage 48, after which the auxiliary slide valve 46 uncovers a port 130 in the main slide valve 45, which port at the seat of the main slide valve, is in registration with the passage 52 leading to the quick action piston chamber 51, so that fluid under pressure now flows through this port and passage from the emergency valve chamber 47 and connected quick action chamber 49 to the quick action piston chamber 51.

After the port 130 has been uncovered, a collar 131 on the emergency piston stem 44 engages the rear end surface 129 of the main slide valve 45, so that the piston as it continues to move, shifts the main slide valve to emergency position. At the time the collar 131 engages the main slide valve, the spring 84 will have been compressed, the compression of the spring being started just prior to the auxiliary slide valve uncovering the port 130.

Now, as the main slide valve is moved toward emergency position, the end of the slide valve moves beyond the passage 130, so that fluid under pressure flows directly from the valve chamber 47 to the passage 52. The space between the port 130 and the rear end of the main slide valve is so slight that as the port 130 is being moved out of registration with the passage 52, the rear end of the valve is uncovering the passage, so that there will be no appreciable interruption in the flow of fluid to the quick action piston chamber.

The pressure of fluid supplied to the quick action piston chamber 51 causes the quick action piston 50 to move inwardly against the opposing pressure of the spring 57, into sealing engagement with the gasket 63 mounted in the casing, in which position the piston will have closed the leakage groove 60. The piston 50, as it is thus moved, shifts the vent valve 54 out of seating engagement with the seat rib 56, thereby opening the valve chamber 55, and consequently the brake pipe passage 15, to the atmosphere by way of chamber 59. With this communication established, fluid under pressure is suddenly vented from the brake pipe for the purpose of transmitting emergency action serially through the train, in the usual well known manner.

With the main slide valve 45 in emergency position, the passage 70 leading from the outer seated area of the valve piston 64 is lapped and the passage 72 leading from the chamber 69 at the other side of the valve piston is connected to the atmosphere by way of cavity 71 in the main slide valve and passage 128. With the passage 72 thus connected to the atmosphere fluid under pressure is vented from the chamber 69, so that fluid at emergency reservoir pressure acting on the other side of the valve piston, causes the valve piston to move and unseat the valve 65 against the opposing pressure of the spring 73. With the valve 64 unseated, fluid under pressure flows from the emergency reservoir to the brake cylinder 6 by way of pipe and passage 28, past the open valve 65, passage 67 and passage and pipe 68, thus high brake cylinder pressure is obtained in an emergency application.

With the quick action piston 50 in sealing engagement with the gasket 63, fluid under pressure is gradually vented from the emergency slide valve chamber 47 and quick action chamber 49 to the atmosphere by way of the choked port 61 in the quick action piston. When the quick action chamber pressure has been reduced to a predetermined degree, by the flow of fluid through the port 61, the spring 57 acts to seat the quick action valve 54, and also acts, through the medium of the stem 53, to return the quick action piston 50 to its extreme outer or normal position, in which position it is shown in the drawing. The rate at which the quick action chamber pressure reduces through the port 61 is slow enough to insure the quick action valve 54 remaining open until substantially the complete venting of fluid from the brake pipe has been accomplished.

Upon the substantially complete venting of fluid from the quick action chamber 49 and valve chamber 47, the pressure of the compressed spring 84, acting through the medium of the piston stem 44, causes the emergency piston 43, and thereby the auxiliary slide valve 46, to move inwardly toward release position relative to the main slide valve 45, but upon engagement of the end of the plunger 83 and the piston stem, the spring 84 will no longer act to retract the piston and auxiliary slide valve, and as a result, the rearward movement of the piston and slide valve ceases before the piston engages the front end surface of the main slide valve. As a consequence, the main slide valve remains in emergency position and maintains the communication from the chamber 69 of the high pressure valve device, to the atmosphere open, so that full emergency pressure is insured.

*Release of the brakes after an emergency application*

To effect the release of the brakes after an emergency application, fluid under pressure is supplied to the brake pipe 2 and flows to the triple valve piston chamber 12 and to the emergency piston chamber 42. Fluid in the triple valve chamber 22 is at reduced auxiliary reservoir pressure and fluid in the emergency valve chamber 47 is at substantially atmospheric pressure, so that upon a slight increase in brake pipe pressure, the emergency piston 42 and slide valves will move to release position before the triple valve piston 18 is caused to move toward release position.

With the several parts of the emergency valve device in release position, the chamber 69, in the high pressure valve device, is again supplied with fluid under pressure from the emergency reservoir and since the chamber at the other side is also subject to fluid at emergency reservoir pressure, the spring 73 acts to seat the high pressure valve 65, thus closing off the communication from the emergency reservoir 5 to the brake cylinder 6. Also in the release position, the quick action chamber 49 and emergency valve chamber 47 are charged with fluid under pressure from the brake pipe by way of port 119 and passage 48, as before described.

In releasing the brakes after an emergency application, the triple valve device and relay valve device function in substantially the same manner as before described in connection with the release of the brakes after a service application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, a brake cylinder and local storage means normally charged with fluid under pressure, of a valve device normally establishing a communication from the brake cylinder to the atmosphere and operative by fluid under pressure constantly supplied thereto from a source of fluid pressure to close said communication, and a controlling valve mechanism operated upon a reduction in brake pipe pressure to effect the operation of said valve device for closing said communication, to effect a local reduction in brake pipe pressure, to establish a communication through which fluid under pressure is supplied from said storage means to the brake cylinder to effect an application of the brakes and to establish another communication through which fluid under pressure is vented from the brake pipe.

2. In a fluid pressure brake equipment, the combination with a brake pipe, a brake cylinder and local storage means normally charged with fluid under pressure, of a valve device normally establishing a communication from the brake cylinder to the atmosphere and operative by fluid under pressure to close said communication, and a controlling valve mechanism operated upon a reduction in brake pipe pressure to first effect the operation of said valve device to close said communication, to then effect an initial local reduction in brake pipe pressure at a relatively rapid rate and to finally effect a local reduction in brake pipe pressure at a slower rate than that of the initial local reduction and to establish a communication through which fluid under pressure is supplied from the storage means to the brake cylinder to effect an application of the brakes.

3. In a fluid pressure brake equipment, the combination with a brake pipe, a brake cylinder and local storage means normally charged with fluid under pressure, of a valve device normally establishing a communication from the brake cylinder to the atmosphere and operative by fluid under pressure to close said communication, and a controlling valve mechanism operated upon a reduction in brake pipe pressure to first effect the operation of said valve device to close said communication, to then effect an initial local reduction in brake pipe pressure at a certain rate and to finally establish a communication through which fluid under pressure is supplied from the storage means to the brake cylinder to effect an application of the brakes, and to establish another communication through which fluid under pressure is locally vented from the brake pipe at a slower rate than the rate of the initial reduction in brake pipe pressure.

4. In a fluid pressure brake equipment, the combination with a brake pipe, a brake cylinder and local storage means normally charged with fluid under pressure, of a valve device normally establishing a communication from the brake cylinder to the atmosphere and operative by fluid under pressure to close said communication, and a controlling valve mechanism operated upon a reduction in brake pipe pressure to first effect the operation of said valve device to close said communication, to then effect an initial reduction in brake pipe pressure and to finally establish a communication through which fluid under pressure is supplied from the storage means to the brake cylinder to effect an application of the brakes and to effect a final local reduction in brake pipe pressure.

5. In a fluid pressure brake equipment, the combination with a brake pipe, a brake cylinder and local storage means normally charged with fluid under pressure, of a valve device normally establishing a communication from the brake cylinder to the atmosphere and operative by fluid under pressure to close said communication, and a brake controlling valve mechanism including a main valve, an auxiliary valve having a movement relative to the main valve, a movable abutment operative upon a reduction in brake pipe pressure for actuating said valves to effect an application of the brakes, means operative upon movement of the auxiliary valve relative to the main valve for effecting the operation of said valve device to close said communication, means also operative upon movement of the auxiliary valve relative to the main valve for locally venting fluid under pressure from the brake pipe and means operative upon movement of both of said valves for supplying fluid under pressure from said storage means to the brake cylinder.

6. In a fluid pressure brake equipment, the combination with a brake pipe, a brake cylinder normally open to the atmosphere, a reservoir charged with fluid under pressure, and an emergency reservoir charged with fluid under pressure, of a brake controlling valve mechanism comprising a movable abutment subject to brake pipe pressure and a main valve and an auxiliary valve operable by said abutment upon a reduction in brake pipe pressure for supplying fluid under pressure from said reservoir to the brake cylinder, said auxiliary valve being initially moved relative to the main valve by said abutment, and a valve device operable by fluid under pressure constantly supplied thereto from the emergency reservoir upon the initial movement of the auxiliary valve for closing communication from the brake cylinder to the atmosphere.

7. In a fluid pressure brake equipment, the combination with a brake pipe, a brake cylinder normally open to the atmosphere, and a reservoir charged with fluid under pressure, of a brake controlling valve mechanism comprising a movable abutment subject to brake pipe pressure and a main valve and an auxiliary valve operable by said abutment upon a reduction in brake pipe pressure for supplying fluid under pressure from said reservoir to the brake cylinder, said auxiliary valve being initially moved relative to the main valve by said abutment to vent fluid under pressure from the brake pipe, and a valve device controlled by said auxiliary valve to operate under the influence of fluid under pressure, when the valve is initially moved to vent fluid from the brake pipe, to close the communication from the brake cylinder to the atmosphere.

8. In a fluid pressure brake equipment, the combination with a brake pipe, a brake cylinder normally open to the atmosphere, a reservoir charged with fluid under pressure, and another reservoir charged with fluid under pressure, of a brake controlling valve mechanism comprising a movable abutment subject to brake pipe pressure and a main valve and an auxiliary valve operable by said abutment upon a reduction in brake pipe pressure for supplying fluid under pressure from said reservoir to the brake cylinder, said auxiliary valve being initially moved relative to the main valve by said abutment, and a valve device normally establishing a communication through which the brake cylinder is open to the atmosphere and operable by fluid under pressure constantly supplied thereto from said other reservoir to close said communication, and means included in said auxiliary valve operative upon the initial movement of the auxiliary valve relative to the main valve for effecting the operation of said valve device.

9. In a fluid pressure brake equipment, the combination with a brake pipe, a brake cylinder normally open to the atmosphere, and a reservoir charged with fluid under pressure, of a brake controlling valve mechanism comprising a movable abutment subject to brake pipe pressure and a main valve and an auxiliary valve operable by said abutment upon a reduction in brake pipe pressure for supplying fluid under pressure from said reservoir to the brake cylinder, said auxiliary valve being initially moved relative to the main valve by said abutment, a valve device normally establishing a communication through which the brake cylinder is open to the atmosphere and operable by fluid under pressure to close said communication, means included in said auxiliary valve operative to effect the operation of said valve device prior to the movement of the main valve, and means included in said auxiliary valve for effecting a local reduction in brake pipe pressure prior to the movement of the main valve.

10. In a fluid pressure brake equipment, the combination with a brake pipe, a brake cylinder normally open to the atmosphere, a reservoir charged with fluid under pressure, and another reservoir charged with fluid under pressure, of a brake controlling valve mechanism comprising a movable abutment subject to brake pipe pressure and a main valve and an auxiliary valve operable by said abutment upon a reduction in brake pipe pressure for supplying fluid under pressure from said reservoir to the brake cylinder, said auxiliary valve being initially moved relative to the main valve by said abutment, and a valve device normally establishing a communication through which the brake cylinder is open to the atmosphere and operable by fluid under pressure constantly supplied thereto from said other reservoir to close said communication, and means in said auxiliary valve and means in said main valve cooperating upon the initial movement of the auxiliary valve relative to the main valve to effect the operation of said valve device, and the means in said main valve in brake applying position operative to prevent said valve device from moving to establish the communication from the brake cylinder to the atmosphere.

11. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon movement of the auxiliary valve relative to the main valve for effecting the operation of said valve device, means also operative upon movement of the auxiliary valve relative to the main valve for venting fluid under pressure from the brake pipe, and means for yieldably opposing movement of said auxiliary valve by said piston means to its brake pipe venting position, said means being ineffective to oppose movement of the auxiliary valve to the position in which the valve effects the operation of said valve device.

12. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon movement of the auxiliary valve relative to the main valve for effecting the operation of said valve device, means also operative upon movement of the auxiliary valve relative to the main valve for venting fluid under pressure from the brake pipe, and means for yieldably opposing movement of said auxiliary valve by said piston means to its brake pipe venting position only after said valve has moved to effect the operation of said valve device.

13. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon movement of the auxiliary valve relative to the main valve for effecting the operation of said valve device, means also operative upon movement of the auxiliary valve relative to the main valve for venting fluid under pressure from the brake pipe, and means for yieldably opposing movement of said auxiliary valve by said piston to its brake pipe venting position only.

14. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon movement of the auxiliary valve relative to the main valve for effecting the operation of said valve device, means also operative upon movement of the auxiliary valve relative to the main valve for venting fluid under pressure from the brake pipe, and means for yieldably opposing movement of said auxiliary valve only in its traverse from the position for effecting the operation of said valve device to its brake pipe venting position.

15. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon movement of the auxiliary valve relative to the main valve for effecting the operation of said valve device, means also operative upon movement of the auxiliary valve relative to the main valve for venting fluid under pressure from the brake pipe, and spring means adapted to cooperate with said piston means and main valve for opposing movement of said auxiliary valve from the position in which the auxiliary valve effects the operation of the valve device to its brake pipe venting position.

16. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon the initial movement of the auxiliary valve relative to the main valve for effecting the operation of said valve device, and means operative upon the further movement of the auxiliary valve relative to the main valve for venting fluid under pressure from the brake pipe, and means for yieldably opposing said further movement of the auxiliary valve.

17. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon the initial movement of the auxiliary valve relative to the main valve for effecting the operation of said valve device, and means operative upon the further movement of the auxiliary valve relative to the main valve for venting fluid under pressure from the brake pipe, and means included in said piston means and cooperating with said main valve for opposing said further movement of the auxiliary valve.

18. In a fluid pressure brake, the combination with a brake pipe and a brake cylinder, of a valve device normally establishing a communication through which the brake cylinder is open to the atmosphere and operative to close said communication, a brake controlling valve mechanism comprising a main valve, an auxiliary valve having a movement relative to the main valve, and piston means operated upon a reduction in brake pipe pressure for operating said valves to effect an application of the brakes, means operative upon the initial movement of the auxiliary valve relative to the main valve for effecting the operation of said valve device, and means operative upon the further movement of the auxiliary valve relative to the main valve for venting fluid under pressure from the brake pipe, and means included in said piston means and cooperating with said main valve for opposing only said further movement of the auxiliary valve.

19. In a fluid pressure brake equipment, the combination with a brake pipe and a brake cylinder, of a valve device normally establishing an atmospheric communication from the brake cylinder and operative by fluid under pressure to close said communication, a quick service reservoir, a brake controlling valve mechanism having a position for effecting the operation of said valve device to close said communication, a quick service position for venting fluid under pressure from the brake pipe to said reservoir and a position for venting fluid under pressure from the brake pipe and for effecting an application of the brakes and operative to said positions upon a reduction in brake pipe pressure, said brake controlling valve mechanism being operable upon an increase in brake pipe pressure to vent fluid under pressure from said reservoir and to effect the operation of said valve device to vent fluid under pressure from the brake cylinder to effect the release of the brakes.

20. In a fluid pressure brake equipment, the combination with a brake pipe, a brake cylinder, an auxiliary reservoir, an additional reservoir and an emergency reservoir, of a brake controlling valve mechanism normally establishing a communication through which fluid under pressure is adapted to be supplied from the brake pipe to the auxiliary reservoir, a valve device normally establishing a communication through which the brake cylinder is open to the atmosphere and also establishing a communication through which fluid under pressure, supplied through the first mentioned communication, flows to the additional reservoir and to the emergency reservoir, said brake controlling valve device being operable upon a reduction in brake pipe pressure to effect the operation of said valve device to close the atmospheric communication from the brake cylinder and to close the communication through which fluid is supplied to said additional reservoir and emergency reservoir, to vent fluid under pressure from the brake pipe and to establish a communication through which fluid under pressure is adapted to be supplied from said auxiliary reservoir and additional reservoir to effect an application of the brakes, said brake controlling valve mechanism being operable upon an increase in brake pipe pressure to establish the first mentioned communication and to effect the operation of said valve device to establish the communication from the brake cylinder to the atmosphere for discharging fluid under pressure from the brake cylinder and to establish the communication between said reservoirs for permitting fluid under pressure to flow from said emergency reservoir to the other two of said reservoirs.

21. In a fluid pressure brake equipment, the combination with a brake pipe, a brake cylinder, an auxiliary reservoir, an additional reservoir and an emergency reservoir, of a brake controlling valve mechanism normally establishing a communication through which fluid under pressure is adapted to be supplied from the brake pipe to the auxiliary reservoir, a valve device normally establishing a communication through which the brake cylinder is open to the atmosphere and also establishing a communication through which fluid under pressure, supplied through the first mentioned communication, flows to the additional reservoir and to the emergency reservoir, said brake controlling valve device being operable upon a reduction in brake pipe pressure to effect the operation of said valve device to close the atmospheric communication from the brake cylinder and to close the communication through which fluid is supplied to said additional reservoir and emergency reservoir, to vent fluid under pressure from the brake pipe and to establish a communication through which fluid under pressure is adapted to be supplied from said auxiliary reservoir and additional reservoir to effect an application of the brakes, said brake controlling valve mechanism being operable upon an increase in brake pipe pressure to establish the first mentioned communication and to effect the operation of said valve device to establish the communication from the brake cylinder to the atmosphere for discharging fluid under pressure from the brake cylinder and to establish the communication between said reservoirs for permitting fluid under pressure to flow from said emergency reservoir to the other two of said reservoirs, means for restricting the rate of flow of fluid under pressure from the emergency reservoir to the auxiliary reservoir and additional reservoir and means for additionally restricting the rate of flow of fluid from the emergency reservoir to said additional reservoir and for restricting the rate of flow of fluid from the brake pipe.

22. In a fluid pressure brake, the combination with a brake pipe, a brake cylinder, an auxiliary reservoir, an additional reservoir and an emergency reservoir, of a valve device normally establishing a communication from the brake cylinder to the atmosphere and also normally establishing a communication open to all of said reservoirs and operative to close both of said communications, a brake controlling valve device normally establishing a communication from the brake pipe to the auxiliary reservoir and to the communication open to said reservoirs, and operative upon a reduction in brake pipe pressure for closing the communication from the brake pipe, for effecting the operation of said valve device to close the communication formerly open to all of the reservoirs and for supplying fluid under pressure from the auxiliary reservoir and additional reservoir to the brake cylinder to effect an application of the brakes, said brake controlling valve device being operable upon an increase in brake pipe pressure to establish the communication from the brake pipe to the auxiliary reservoir and to effect the operation of said valve device to release fluid under pressure from the brake cylinder and to establish the communication open to all of said reservoirs to permit fluid under pressure to flow from the emergency reservoir to said auxiliary reservoir and additional reservoir and to also permit fluid under pressure to flow from the brake pipe to said additional reservoir and said emergency reservoir.

23. In a fluid pressure brake, the combination with a brake pipe, a brake cylinder, an auxiliary reservoir, an additional reservoir and an emergency reservoir, of a valve device normally establishing a communication from the brake cylinder to the atmosphere and also normally establishing a communication open to all of said reservoirs and operative to close both of said communications, a brake controlling valve device normally establishing a communication from the brake pipe to the auxiliary reservoir and to the communication open to said reservoirs, and operative upon a reduction in brake pipe pressure for closing the communication from the brake pipe, for effecting the operation of said valve device to close the communication formerly open to all of the reservoirs and for supplying fluid under pressure from the auxiliary reservoir and additional reservoir to the brake cylinder to effect an application of the brakes, said brake controlling valve device being operable upon an increase in brake pipe pressure to establish the communication from the brake pipe to the auxiliary reservoir and to effect the operation of said valve device to release fluid under pressure from the brake cylinder and to establish the communication open to all of said reservoirs to permit fluid under pressure to flow from the emergency reservoir to said auxiliary reservoir and additional reservoir and to also permit fluid under pressure to flow from the brake pipe to said additional reservoir and said emergency reservoir, means for restricting the rate of flow of fluid from and to the emergency reservoir and means for restricting the rate of flow of fluid to said additional reservoir.

24. In a fluid pressure brake, the combination with a brake pipe, a brake cylinder, an auxiliary reservoir, an additional reservoir and an emergency reservoir, of a valve device normally establishing a communication from the brake cylinder to the atmosphere and also normally establishing a communication open to all of said reservoirs and operative to close both of said communications, a brake controlling valve device normally establishing a communication from the brake pipe to the auxiliary reservoir and to the communication open to said reservoirs, and operative upon a reduction in brake pipe pressure for closing the communication from the brake pipe, for effecting the operation of said valve device to close the communication formerly open to all of the reservoirs and for supplying fluid under pressure from the auxiliary reservoir and additional reservoir to the brake cylinder to effect an application of the brakes, said brake controlling valve device being operable upon an increase in brake pipe pressure to establish the communication from the brake pipe to the auxiliary reservoir and to effect the operation of said valve device to release fluid under pressure from the brake cylinder and to establish the communication open to all of said reservoirs to permit fluid under pressure to flow from the emergency reservoir to said auxiliary reservoir and additional reservoir and to also permit fluid under pressure to flow from the brake pipe to said additional reservoir and said emergency reservoir, means for restricting the rate of flow of fluid from and to the emergency reservoir and means for restricting the rate of flow of fluid to said additional reservoir.

ELLIS E. HEWITT.